(12) United States Patent  (10) Patent No.: US 9,336,589 B2
Mochizuki et al.  (45) Date of Patent: May 10, 2016

(54) SHEET FEEDER

(75) Inventors: Jun Mochizuki, Takashima (JP); Masayuki Kashiba, Takashima (JP)

(73) Assignee: HORIZON INTERNATIONAL INC., Shiga (JP)

( * ) Notice: Subject to any disclaimer, the term of this patent is extended or adjusted under 35 U.S.C. 154(b) by 0 days.

(21) Appl. No.: 14/407,902

(22) PCT Filed: Jul. 6, 2012

(86) PCT No.: PCT/JP2012/067356
§ 371 (c)(1),
(2), (4) Date: Dec. 12, 2014

(87) PCT Pub. No.: WO2014/006747
PCT Pub. Date: Jan. 9, 2014

(65) Prior Publication Data
US 2015/0170349 A1    Jun. 18, 2015

(51) Int. Cl.
*G06K 9/00* (2006.01)
*G06T 7/00* (2006.01)
(Continued)

(52) U.S. Cl.
CPC . *G06T 7/001* (2013.01); *B42C 1/12* (2013.01); *B65H 1/00* (2013.01); *B65H 3/128* (2013.01);
(Continued)

(58) Field of Classification Search
CPC .................................. B65H 39/00; G06T 7/00
USPC ............... 382/133, 317; 270/7–17, 42, 52.08, 270/52.09, 52.13, 58.01, 45, 46, 52.21, 270/52.22; 271/3.01, 3.08, 3.14, 8.1, 9.02, 271/9.4, 35, 131, 158, 254
See application file for complete search history.

(56) References Cited

U.S. PATENT DOCUMENTS 5,971,394 A * 10/1999 Kida .................... B42C 1/12
 270/58.01
6,145,825 A * 11/2000 Kunihiro ................ B42C 1/12
 227/29
(Continued)

FOREIGN PATENT DOCUMENTS

JP      11-322201 A     11/1999
JP     2004-114566 A    4/2004
(Continued)

OTHER PUBLICATIONS

International Search Report dated Aug. 7, 2012 issued in corresponding application No. PCT/JP2012/067356.
International Preliminary Report on Patentability (Form PCT/IB/373) of International Application No. PCT/JP2012/067356 dated Jan. 6, 2015, with Form PCT/ISA/237.

*Primary Examiner* — Abolfazl Tabatabai
(74) *Attorney, Agent, or Firm* — Westerman, Hattori, Daniels & Adrian, LLP

(57) ABSTRACT

The paper feeder comprises a first transport unit (5) to transport a sheet (S) on top of a paper stack (2) on a paper loading table (3), and a second transport unit (6) to discharge sheets transferred from the first transport unit toward a binding device. The first transport unit begins transporting the next sheet each time a sheet is discharged from the second transport unit. Image data for a specified printed portion on the first sheet in the paper stack is stored in memory (19) as reference data. A camera (14) is disposed above the paper stack and photographs a region corresponding to the specified printed portion on the topmost sheet. A control unit (18) compares the image data for the paper photographed by the camera with the reference data, and if the image data matches the reference data, the first transport unit operations are paused.

4 Claims, 5 Drawing Sheets

(51) Int. Cl.
  *B65H 39/10* (2006.01)
  *B65H 3/12* (2006.01)
  *B65H 7/18* (2006.01)
  *B65H 1/00* (2006.01)
  *B65H 7/14* (2006.01)
  *B65H 7/20* (2006.01)
  *B42C 1/12* (2006.01)
  *B65H 39/00* (2006.01)

(52) U.S. Cl.
  CPC .. *B65H 7/14* (2013.01); *B65H 7/18* (2013.01); *B65H 7/20* (2013.01); *B65H 39/10* (2013.01); *B65H 2511/413* (2013.01); *B65H 2513/51* (2013.01); *B65H 2801/48* (2013.01)

(56) References Cited

U.S. PATENT DOCUMENTS 7,681,873 B2 * 3/2010 Tsutsui ............... B65H 37/04
  270/52.18
2005/0093223 A1 * 5/2005 Kashiba et al. ............... 271/90

FOREIGN PATENT DOCUMENTS

| JP | 2005-132554 A | 5/2005 |
| JP | 2007-136925 A | 6/2007 |
| JP | 2011219221 | 11/2011 |

* cited by examiner (A)

(B)

SHEET FEEDER

TECHNICAL FIELD

The present invention relates to a sheet feeder feeding sheets one by one to a book binding machine from a sheet stack formed of a plurality of individual sheet bundles each of which corresponds to a book block composed of collated sheets, and stopping the sheet feed temporarily whenever the sheet feed of one sheet bundle is completed.

BACKGROUND ART

In the prior art, there are book binding systems provided with a sheet feeder which feeds sheets one by one from a sheet stack outputted from a printer or a copier and formed of a plurality of individual sheet bundles each of which consists of collated sheets and corresponds to one book block, and a book binding unit which receives the sheets from the sheet feeder and binds each of the sheet bundles into a booklet or a book. Also there are book binding system provided with a collator which produces a sheet stack formed of a plurality of individual sheet bundles each of which consists of collated sheets and corresponds to one book block, a sheet feeder which feeds sheets one by one from the sheet stack, and a book binding unit which receives the sheets from the sheet feeder and binds each of the sheet bundles into a booklet or a book.

According to such book binding systems, it is necessary to detect boundaries of the sheet bundles of the sheet stack and conduct the sheet feed from the sheet feeder to the book binding unit for each sheet bundle.

Therefore, there has been a sheet feeder which automatically detects the boundaries of the sheet bundles of the sheet stack and stops the sheet feed temporarily whenever the sheet feed of one sheet bundle is completed (also see, for example, JP 1999-322201 A).

This sheet feeder has, as shown in FIG. 5, a shelf 30 movable in a vertical direction and supporting a sheet stack 31 thereon, a first conveyance unit A arranged above and opposite to the uppermost sheet of the sheet stack 31 on the shelf 30 so as to convey the uppermost sheet forward by engaging with the uppermost sheet, and a second conveyance unit B arranged at the downstream of the first conveyance unit A so as to receive the sheet from the first conveyance unit A and discharge the sheet to the book binding apparatus.

The first conveyance unit A is composed of a feed roller 32, a drive sprocket 34 fixed to a drive shaft of a motor 33, an auxiliary roller 35, and a drive belt 36 extending among the feed roller 32, the drive sprocket 34 and the auxiliary roller 35.

While the shelf 30 is gradually raised, the periphery surface of the feed roller 32 is rotated by the motor 33 and feeds the uppermost sheet of the sheet stack 31 forward by engaging with the uppermost sheet.

The second conveyance unit B is composed of a conveying belt 41 extending between two parallel idle rollers 37, 38, a drive sprocket 40 fixed to a drive shaft of a motor 39, a drive belt 42 extending between the drive sprocket 40 and the idle roller 38, and feed rollers 43 arranged above the conveying belt 41 and spaced from one another in a sheet feed direction.

The idle roller 38 is rotated by the motor 39 through the drive belt 42, and thereby the conveying belt 41 is circulated so that the sheet fed from the first conveyance unit A is conveyed by the conveying belt 41 and discharged to a sheet accumulating unit 46 of the book binding machine.

The vertical movement of the shelf 30 and the operation of each of the first and second sheet conveyance units A, B are controlled by a control unit (not shown).

At the beginning of the conveying belt 41, that is, the second conveyance unit B, a sensor 44 is arranged to count the sheets delivered from the first conveyance unit A to the second conveyance unit B. Furthermore, an image sensor 45 is arranged at the downstream of the sensor 44 to take images of printed areas of the sheets.

Although not shown the drawing, the sheet feeder has a memory and images of printed areas of the first sheets of the sheet bundles are pre-stored as reference data.

Thus, after the sheet feeder starts its operation, the sheets fed to the conveying belt 41 are counted by the sensor 44. When all of the sheets of one sheet bundle are counted and the next sheet (corresponding to the first sheet of the next sheet bundle) is counted, the control unit compares between the image data of the printed area of the such sheet outputted from the image sensor 45 and the reference data. In the case of an agreement between the image data and the reference data, the control unit stops the first conveyance unit A temporarily so as to stop the feed of the such sheet to the second conveyance unit B. During this momentary pause, the previous sheet bundle is bound into a booklet or a book by the book binding apparatus.

However, in this conventional sheet feeder, the image sensor 45 takes the images of the sheets while the sheets are conveyed by the conveying belt 41 and therefore, in order to obtain a high-definition and sharp image, it is necessary to convey the sheets at sufficient low speed. Therefore, there is a limit on speeding up of the sheet feed.

In addition, according to this conventional sheet feeder, the image sensor 45 continuously takes the images of the sheets while the sheets are conveyed by the conveying belt 41, and the comparison between the image data outputted from the image sensor 45 and the reference data should be made by the control unit at the same time as the image sensor 45 takes the image of the sheet within a range of the sheet corresponding to the printed area of the first sheet of the sheet bundle. Therefore, the control unit receives the image from the image sensor 45 at a timing predetermined based on the velocity of the sheet and the positional information of the image sensor 45.

However, the velocity of the sheet fluctuates easily depending on the variety and thickness and so on of the sheet and thereby the timing of the image capture by the control unit from the image sensor is deviated, which possibly causes a detection error that the comparison between the image data containing no image to be compared and the reference data is made by the control unit. Such detection error may be avoided by broadening a sensing area of the image sensor 45. But if the sensing area of the image sensor 45 is broaden, the image data outputted from the image sensor 45 contains a great deal of unnecessary image as well as the image to be compared and an image processing of extracting the image data to be compared from this outputted data needs a lot of time and thereby the speeding up of the sheet feed is restricted.

SUMMARY OF THE INVENTION

Problems to be Solved by the Invention

It is, therefore, an object of the present invention to provide a sheet feeder capable of correctly detecting the boundaries of sheet bundles of a sheet stack, each of which corresponds to a book block, while supplying the sheets faster than the conventional sheet feeders.

Means for Solving the Problems

In order to achieve such object, the present invention provides A sheet feeder feeding sheets one by one to a book binding machine from a sheet stack formed of a plurality of individual sheet bundles each of which corresponds to a book block composed of collated sheets, and stopping the sheet feed temporarily whenever the sheet feed of one sheet bundle is completed, the sheet feeder comprising: a frame; a shelf attached to the frame so as to move in a vertical direction with the sheet stack placed thereon; a vertical alignment plate attached to the frame and arranged adjacent to the front end of the shelf and opposite to the front face of the sheet stack on the shelf; a first conveyance unit attached to the frame and arranged above and opposite to the uppermost sheet of the sheet stack on the shelf in such a way that the first conveyance unit conveys the uppermost sheet forward beyond the alignment plate by engaging with or sucking the uppermost sheet; a second conveyance unit attached to the frame and arranged at the downstream of the first conveyance unit so as to receive the sheet from the first conveyance unit and discharge the sheet to the book binding apparatus; a control unit controlling the movement of the shelf and the operation of the first and second conveyance units, the first conveyance unit starts conveying the next sheet whenever the previous sheet is discharged from the second conveyance unit; a memory in which images of predetermined printed areas of the first or last sheets of the sheet bundles are preliminarily stored as reference data; and a camera supported by the frame and arranged above the sheet stack on the shelf so as to take an image of the uppermost sheet of the sheet stack within a range of the sheet corresponding to the predetermined printed area, wherein the control unit compares the image of the sheet obtained by the camera with the reference data, when the obtained image of the sheet agrees with the reference data which is the image of the predetermined printed area of the first sheet, the control unit stops the operation of the first conveyance unit temporarily, and when the obtained image of the sheet agrees with the reference data which is the image of the predetermined printed area of the last sheet, the control unit stops the operation of the first conveyance unit temporarily after the such sheet is discharged from the second conveyance unit.

According to a preferred embodiment of the present invention, the alignment plate is provided with an air blower, the air blower constantly blowing air toward upper sheets of the sheet stack in such a manner that the upper sheets are spaced from the sheet stack and separated from one another, wherein the first conveyance unit comprises: horizontal drive and idle rollers supported by the frame and arranged above the shelf and parallel to each other at a distance from each other in the sheet feed direction; a suction belt extending between the drive and idle rollers to circulate; a suction box supported by the frame and arranged between upper and lower linear portions of the suction belt, the suction box having a plurality of intake ports at the under surface thereof; and a suction unit connected to the suction box so as to create negative pressure in the suction box, the uppermost sheet being conveyed to the second conveyance unit by the suction box sucking the sheet through the circulating suction belt, and wherein the camera is supported by a supporting mechanism attached to the frame and the supporting mechanism is provided with a camera holder, the camera holder comprising: a holding portion holding the camera in such a manner that the camera is directed to downward; an image capturing guide arranged below and opposite to a lens of the camera, the image capturing guide having an aperture at the center thereof and the horizontal flat under surface; and a connecting portion extending between the image capturing guide and the holding portion, and wherein the camera holder is set in such a manner that the aperture of the image capturing guide aligns with the predetermined printed areas of the first or last sheets of the sheet bundles, the uppermost sheet floating above the sheet stack contacts with the under surface of the image capturing guide, and the control unit compares between the image obtained by the camera through the aperture during the contact of the uppermost sheet with the image capturing guide and the reference data.

According to another preferred embodiment of the present invention, a sensor is arranged at the exit of the second conveyance unit to detect the passage of the leading end of the sheet, and the sheet following the detected sheet contact with the image capturing guide whenever the sensor outputs a detection signal, and wherein the control unit compares the image obtained by the camera through the aperture with the reference data.

According to a further preferred embodiment of the present invention, the supporting mechanism comprises: a first guide rail fixed to the frame and arranged above the sheet stack on the shelf in such a way that the first guide rail horizontally extends in a width direction of the sheet stack; a first slider slidably attached to the first guide rail; a second guide rail fixed to the first slider and extending from the first slider perpendicularly to the first guide rail and in a length direction of the sheet stack; a second slider slidably attached to the second guide rail; and a camera holder attached to the second slider.

Effect of the Invention

According to the present invention, before the uppermost sheet of the sheet stack is fed to the book binding apparatus, the image of the uppermost sheet in an almost rest state is taken by the camera arranged above the sheet stack. Therefore, the images of the sheets can be taken by the camera while limiting to the range of the sheets corresponding to the predetermined printed area of the first or last sheet of each of the sheet bundles and thereby the high divisional and sharp image data can be obtained. As a result, the speed of image processing for comparison of the image data taken by the camera with the reference data is increased.

Also, according to the present invention, the image data of the uppermost sheet taken by the camera before transport of the uppermost sheet is compared with the reference data and thereby, even though the velocity of the sheet fluctuates depending on the variety and thickness and so on of the sheet, the timing of the image capture of the control unit from the image sensor is maintained constant.

BEST MODE FOR CARRYING OUT THE INVENTION

Figure 1:
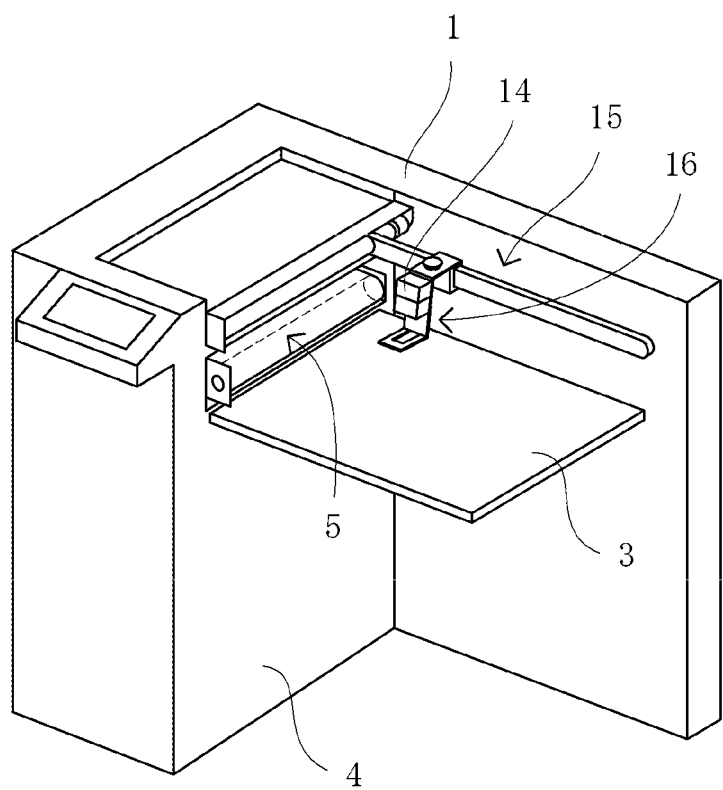
FIG. 1 is a perspective view of a sheet feeder according to one embodiment of the present invention.

A preferred embodiment according to the present invention will be explained below with reference to the accompanying drawings. FIG. 1 is a perspective view of a sheet feeder according to one embodiment of the present invention, and FIG. 2 is a schematic front view of the sheet feeder shown in FIG. 1.

Figure 2:
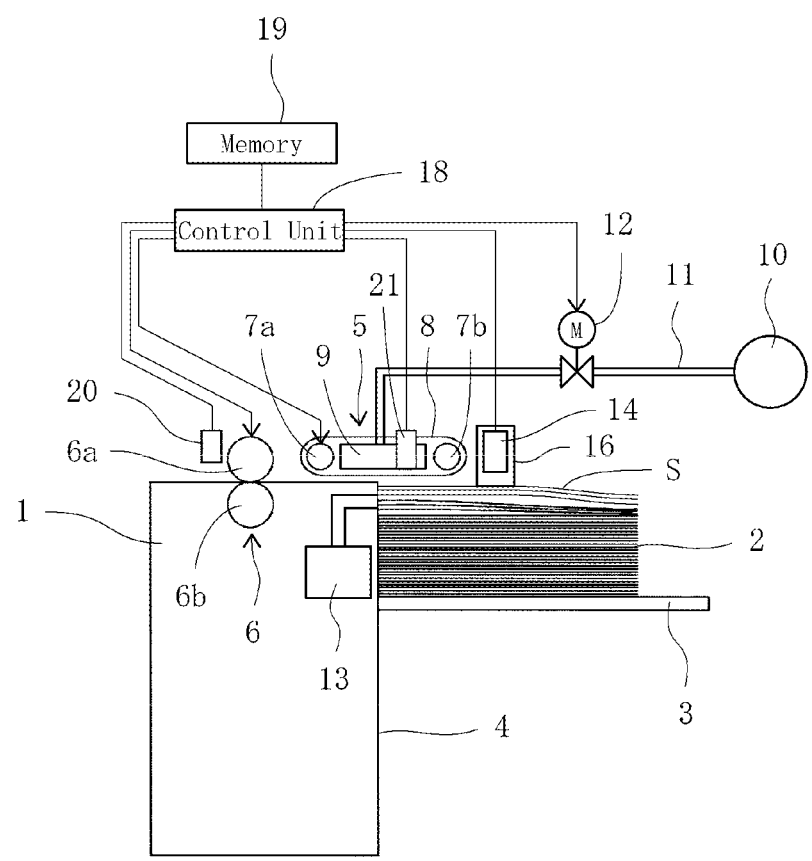
FIG. 2 is a schematic front view of the sheet feeder shown in FIG. 1.

Referring to FIGS. 1 and 2, a sheet feeder according to the present invention comprises a frame 1, a shelf 3 attached to the frame 1 so as to move in a vertical direction with the sheet stack 2 placed thereon, and a vertical alignment plate 4 attached to the frame 1 and arranged adjacent to the front end of the shelf 3 and opposite to the front face of the sheet stack 2 on the shelf 3.

The sheet stack 2 is formed of a plurality of sheet bundles each of which corresponds to a book block composed of collated sheets. The shelf 3 is supported by a known elevating mechanism (not shown) so as to move up and down. The vertical movement of the shelf 3 is controlled by a control unit 18.

The sheet feeder also comprises a first conveyance unit 5 attached to the frame 1 and arranged above and opposite to the uppermost sheet S of the sheet stack 2 on the shelf 3 in such a way that the first conveyance unit 5 conveys the uppermost sheet S forward beyond the alignment plate 4 by sucking the uppermost sheet S, and a second conveyance unit 6 attached to the frame 1 and arranged at the downstream of the first conveyance unit 5 so as to receive the sheet from the first conveyance unit 5 and discharge the sheet to a book binding apparatus (not shown).

In this embodiment, the first conveyance unit 5 comprises horizontal drive and idle rollers 7a, 7b supported by the frame 1 and arranged above the shelf 3 and parallel to each other at a distance from each other in the sheet feed direction, a suction belt 8 extending between the drive and idle rollers 7a, 7b to circulate, and a suction box 9 supported by the frame 1 and arranged between upper and lower linear portions of the suction belt 8. The suction box 9 has a plurality of intake ports at the under surface thereof.

A suction unit is connected to the suction box 9 so as to create negative pressure in the suction box 9. In this embodiment, the suction unit is composed of a suction pump 10, a suction pipe 11 connecting between the suction pump 10 and the suction box 9, and an electromagnetic valve 12 arranged in the middle of the suction pipe 11. Then the suction box 9 is activated and deactivated by opening and closing the electromagnetic valve 12.

Thus the opening and closing of the electromagnetic valve 12 is controlled by a control unit 18 at predetermined timing so that the uppermost sheet S is conveyed to the second conveyance unit 6 by the suction box 9 sucking the sheet S through the circulating suction belt 8.

The second conveyance unit 6 comprises a horizontal drive roller 6a extending perpendicularly to the sheet feed direction and supported by the frame 1 to rotate about its axis, and a horizontal idle roller 6b arranged under and adjacent to the drive roller 6a and supported by the frame 1 to rotate about its axis. the drive roller 6a is rotated by a motor (not shown) and the motor is controlled by the control unit 18.

The alignment plate 4 is provided with an air blower 13 which constantly blows air toward upper sheets of the sheet stack 2 in such a manner that the upper sheets are spaced from the sheet stack 2 and separated from one another.

Then, after the sheet feeder starts its operation, the uppermost sheet S is floated by the air flow and sucked by the suction box 9 through the circulating suction belt 8 and conveyed forward, and when the leading end of the uppermost sheet S arrives at a gap between the drive and idle rollers 6a, 6b, the suction of the sheet S by the suction box 9 is stopped. Thereby the sheet S is forwardly conveyed by the drive and idle rollers 6a, 6b to the book binding apparatus.

After the sheet S is discharged, the suction box 9 is activated again so that the uppermost sheet (the sheet occupying the uppermost position of the sheet stack 2 next) following the previous uppermost sheet) is floated by the airflow and forwardly conveyed to the book binding apparatus.

The sheets of the sheet stack 2 decrease gradually with the repetition of the feed of sheets and correspondingly the shelf 3 moves upward gradually. This upward motion of the shelf is made in such a way that a distance between the suction belt 8 and the uppermost sheet S is maintained approximately constant. In this embodiment, a range sensor 21 is arranged adjacent to the suction box 9 so as to detect a distance from the uppermost sheet S and the upward motion of the shelf 3 is controlled by the control unit 18 based on detection signals of the range sensor 21.

A camera 14 is arranged above the sheet stack 2 on the shelf 3. The camera 14 is supported by a supporting mechanism 15 attached to the frame 1.

Figure 3:
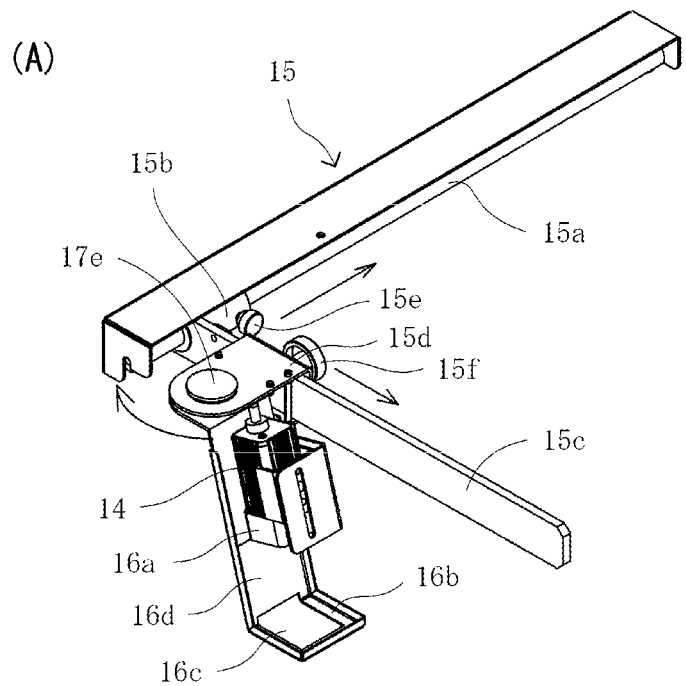
FIG. 3 is a perspective view of a camera and a supporting mechanism for the camera of the sheet feeder shown in FIG. 1.
Figure 3:
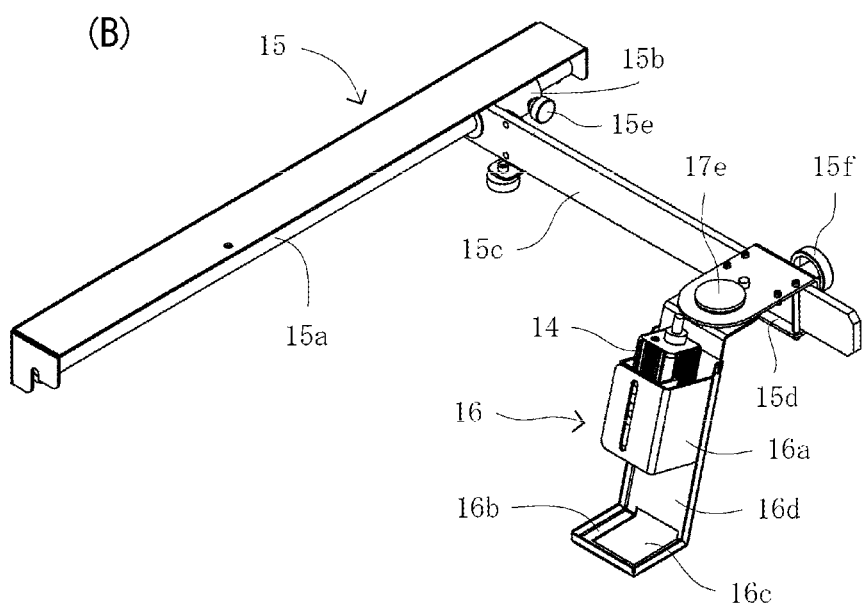
Figure 4:
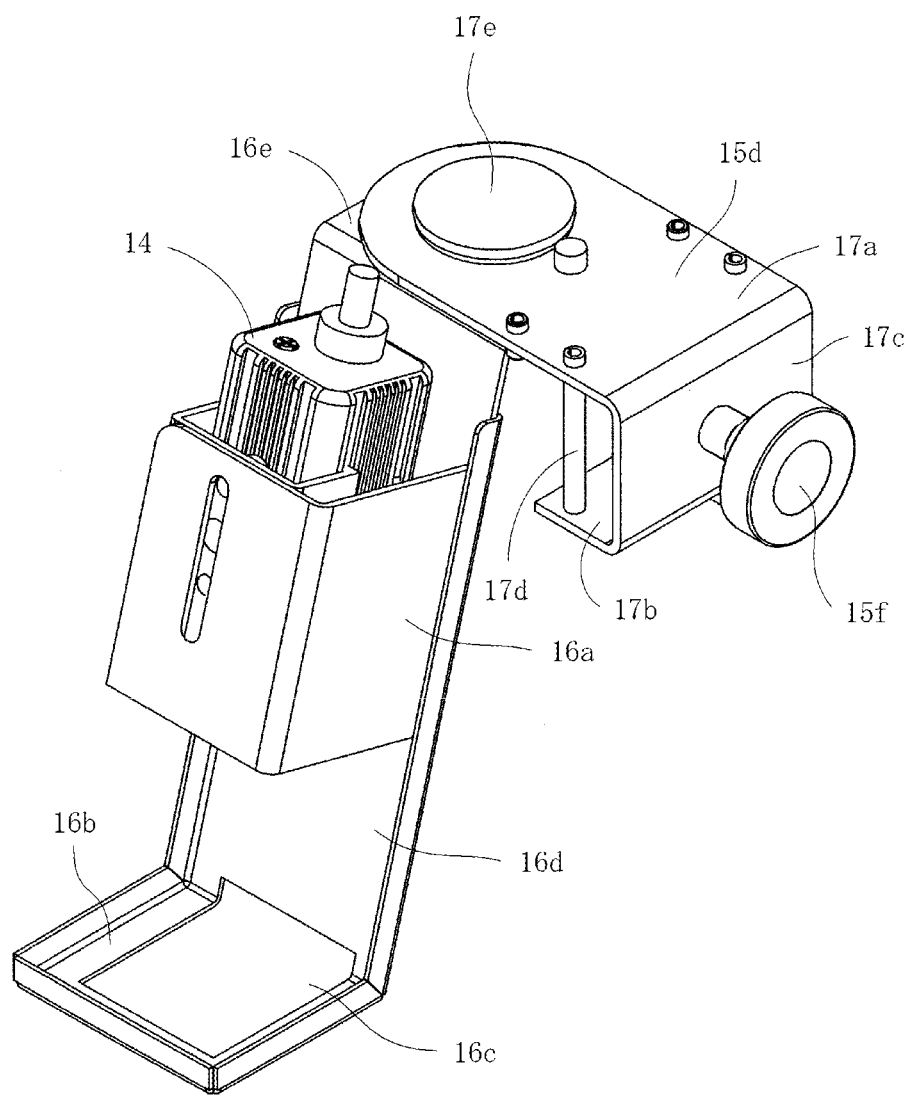
FIG. 4 is an enlarged perspective view of a camera holder of the supporting mechanism shown in FIG. 3.
Figure 5:
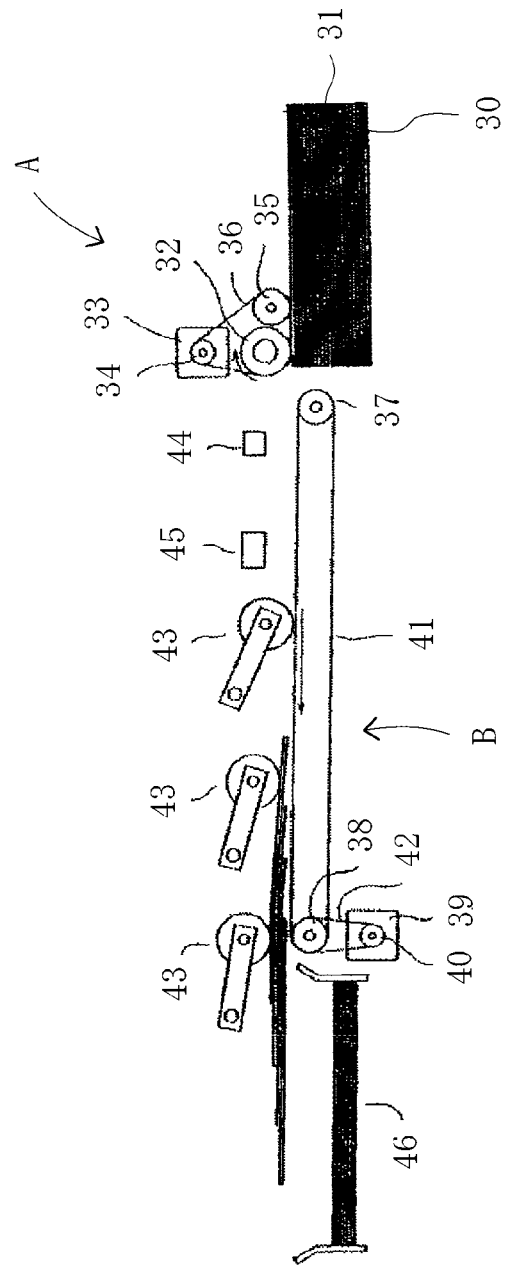
FIG. 5 is a schematic front view of a conventional sheet feeder.

FIG. 3 is a perspective view of this supporting mechanism and FIG. 4 is an enlarged perspective view of a camera holder of the supporting mechanism shown in FIG. 3.

Referring to FIG. 3, the supporting mechanism 15 comprises a first guide rail 15a fixed to the frame 1 and arranged above the sheet stack 2 on the shelf 3 in such a way that the first guide rail 15a horizontally extends in a width direction of the sheet stack 2, and a first slider 15b slidably attached to the first guide rail 15a.

In this embodiment, the first guide rail 15a is a bar which is circular in cross-section and the first slider 15b is a cylinder whose inner diameter is larger than the outer diameter of the first guide rail 15a. The first slider 15b is provided with a threaded bore at its side wall and a stop screw 15e is screwed into the threaded bore. Then the first slider 15b can be fixed at the desired position on the first guide rail 15a by firmly screwing the stop screw 15e into the threaded bore.

The supporting mechanism 15 also comprises a second guide rail 15c fixed to the first slider 15b and extending from the first slider 15b perpendicularly to the first guide rail 15a and in a length direction of the sheet stack 2, and a second slider 15d slidably attached to the second guide rail 15c.

In this embodiment, the second guide rail 15c is an elongated plate, and the second slider 15d has a substantially U-shaped cross-section and is composed of a pair of parallel wall portion 17a, 17b spaced from each other in a vertical direction, and a vertical wall portion 17c connecting the parallel wall portions 17a, 17b. The upper wall portion 17a of the parallel wall portions 17a, 17b sticks out of the lower wall portion 17b. Furthermore, the pair of parallel wall portions 17a, 17b is provided with a guide roller 17d at both ends thereof. The guide roller 17a extends between the parallel wall portions 17a, 17b and is arranged parallel to the vertical wall portion 17c.

The second guide rail 15c extends through a space formed by the vertical wall portion 17c, the pair of parallel wall portions 17a, 17b and the guide rollers 17d.

The vertical wall portion 17c is provided with a threaded bore and a stop screw 15f is screwed into the threaded bore.

The second slider 15*d* can be fixed at the desired position on the second guide rail 15*c* by firmly screwing the stop screw 15*f* into the threaded bore.

A camera holder 16 is attached to the second slider 15*d*. Thereby the camera holder 16 can be moved in width and length directions of the sheet stack 2 on a horizontal plane and arranged at any place above the uppermost sheet S of the sheet stack 2.

Referring to FIG. 4, the camera holder 16 comprises a holding portion 16*a* holding the camera 14 in such a manner that the camera 14 is directed to downward. The holding portion 16*a* has a horizontal plate-like extension 16*e* contacting with the under surface of the projecting portion of the upper wall portion 17*a* of the second slider 15*d*. Then the holding portion 16*a* is connected to the projecting portion of the upper wall portion 17*a* at the extension 16*e* by a pivot pin 17*e* so as to rotate about the pivot pin 17*e* and be fixed at any position within the range of rotating movement.

The camera holder 16 also comprises an image capturing guide 16*b* arranged below and opposite to a lens of the camera 14. The image capturing guide 16*b* has an aperture 16*c* at the center thereof and the horizontal flat under surface. Furthermore, the camera holder 16 comprises a connecting portion 16*d* extending between the image capturing guide 16*b* and the holding portion 16*a*. In this embodiment, though the image capturing guide 16*b* is in the form of a flat plate, the image capturing guide 16*b* may have any configuration insofar as it has the aperture at the center thereof and the horizontal flat under surface.

Thus the uppermost sheet S floating above the sheet stack 2 collides with the under surface of the image capturing guide 16*b* and then contacts with the undersurface of the image capturing guide 16*b* while the uppermost sheet S is conveyed by the suction belt 8 and the suction box 9.

The sheet feeder also comprises a memory 19 in which an image of a predetermined printed area on the first or last sheet of each of the sheet bundles is preliminarily stored as reference data. In this case, the first sheet of the sheet bundle forms normally a front cover of a book or a booklet to be manufactured and, on most occasions, special characters and pictures which do not exist on the remaining sheets at all are printed on the first sheet of the sheet bundle. Therefore, it is possible to easily and accurately detect the first sheet of each sheet bundle (boundaries of the sheet bundles) by using these special characters and pictures printed only on the front covers as identification marks.

Namely, it is preferable to choose as the predetermined printed areas of the first sheets of the sheet bundles characteristic printings such as titles or logos provided only on the front covers and store images of the characteristic printings as the reference data in the memory 19.

In this case, the images of the predetermined printed areas of the first sheets of the sheet bundles may be preliminarily obtained and the obtained image data may be stored in the memory 19, or the images of the predetermined printed areas of the first sheets of the sheet bundles may be taken by the camera 14 of the sheet feeder prior to start of operation of the sheet feeder and the obtained image data is stored in the memory 19.

The camera holder 16 is set in such a manner that the aperture 16*c* of the image capturing guide 16*b* aligns with the predetermined printed areas of the first sheets of the sheet bundles. This setting is as follows: Prior to start of operation of the sheet feeder, the first and second conveyance units 5, 6 are stopped while only the air blower 13 is activated. Then the camera holder 16 is moved to a position at which the aperture 16*c* aligns with the predetermined printed area while contacting the uppermost sheet S of the sheet stack 2 with the under surface of the image capturing guide 16*b*, and, when the camera holder 16 is arrived at the position, the first and second sliders 15*b*, 15*d* are fixed to the first and second guide rails 15*a*, 15*c* and further, as necessary, the camera holder 16 is rotated about the pivot pin 17*e* by the desired angle.

The sheet feeder further comprises a sensor 20 arranged at the exit of the pair of drive and idle rollers 6*a*, 6*b* (the second conveyance unit 6) to detect the passage of the leading end of the sheet. Then, whenever the sensor 20 outputs a detection signal, the sheet following the detected sheet contacts with the under surface of the image capturing guide 16*b*.

Thus in operation of the sheet feeder, the control unit 18 compares the image obtained by the camera 14 through the aperture 16*c* with the reference data.

When the image data does not agree with the reference data, the control unit 18 activates the suction box 9 after the sheet detected by the sensor 20 is discharged. Thereby the next sheet S is conveyed to the pair of drive and idle rollers 6*a*, 6*b* by the circulating suction belt 8. When the leading end of the sheet S reaches a gap between the drive and idle rollers 6*a*, 6*b*, the control unit 18 deactivates the suction box 9. Then the sheet S is conveyed forward by the drive and idle rollers 6*a*, 6*b*, and when the leading end of the sheet S passes the sensor 20, a detection signal is outputted from the sensor 20. Thereby the control unit 18 compares the image data of the sheet with the reference data as before.

When the image data agrees with the reference data, the control unit 18 stops the suction box 9 temporarily so as to temporarily stop the feed operation of the first conveyance unit 5. During this momentary pause, one sheet bundle fed to the book binding apparatus and corresponding to a book block is bound into a booklet or a book.

Although in the above-mentioned embodiment, the control unit 18 receives the image data obtained by the camera 14 when a detection signal is outputted from the sensor 20, a timing of reception of the image data from the camera 14 to the control unit 18 is not limited to this embodiment. The control unit 18 can receives the image data from the camera 14 at any timing insofar as the uppermost sheet S of the sheet stack 2 contacts with the image capturing guide 16*b* before the uppermost sheet S is conveyed to the first conveyance unit 5.

According to a variation of the above-mentioned embodiment, the data of the total number of sheets for each sheet bundle is preliminarily stored in the memory 19, and the control unit 18 counts the sheets fed to the book binding apparatus based on the detection signals outputted from the sensor 20. When the image data obtained by the camera 14 agrees with the reference data and the count value agrees with the data of the total number of sheets stored in the memory 19, the control unit 18 detects the boundary of the sheet bundles. Thereby the detection of the boundaries of the sheet bundles can be made more accurately.

According to the present invention, before the uppermost sheet of the sheet stack is conveyed to the book binding apparatus, the image of the uppermost sheet in an almost rest state is taken by the camera arranged above the sheet stack. Therefore, the images of the sheets can be taken by the camera while limiting to the range of the sheets corresponding to the predetermined printed area of the first or last sheet of each of the sheet bundles and thereby the high divisional and sharp image data can be obtained. Consequently, the speed of image processing for comparison between the image data taken by the camera and the reference data is increased.

Also, according to the present invention, the image data of the uppermost sheet taken by the camera before transport of the uppermost sheet is compared with the reference data and thereby, even though the velocity of the sheet fluctuates depending on the variety and thickness and so on of the sheet, the timing of the image capture of the control unit from the image sensor is maintained constant.

Although one preferred embodiment of the present invention has been explained, the present invention is not limited to the above-mentioned embodiment.

For example, the first conveyance unit 5 may be a unit which is composed of a conveying belt extending between drive and idle rollers to feed sheets by engaging with the sheets instead of the unit which feeds sheets by sucking the sheets. In this case, the air blower 13 is not required because it is not necessary to space upper sheets from the sheet stack 2 in a manner such that the upper sheets are separated from one another. In addition, the image capturing guide 16b and the connecting portion 16d of the camera holder 16 are not needed.

In the above-mentioned embodiment, although the boundaries of the sheet bundles are detected by identifying the predetermined printed areas of the first sheets of the sheet bundles, it is possible to detect the boundaries of the sheet bundles by identifying the predetermined printed areas of the last sheets of the sheet bundles. In this case, the image data of the predetermined printed areas of the last sheets of the sheet bundles as the reference data are preliminarily stored in the memory 19, and the control unit 18 compares the image data obtained by the camera 14 with the reference data. Then, when the image data obtained by the camera 14 agrees with the reference data, the control unit 18 stops the operation of the first conveyance unit 5 temporarily after the such sheet is discharged from the second conveyance unit 6.

DESCRIPTION OF REFERENCE NUMERALS

1 Frame
2 Sheet stack
3 Shelf
4 Alignment plate
5 First conveyance unit
6 Second conveyance unit
6a Drive roller
6b Idle roller
7a Drive roller
7b Feed roller
8 Suction belt
9 Suction box
10 Suction pump
11 Suction pipe
12 Electromagnetic valve
13 Air blower
14 Camera
15 Supporting mechanism
15a First guide rail
15b First slider
15c Second guide rail
15d Second slider
15e Stop screw
15f Stop screw
16 Camera holder
16a Holding portion
16b Image capturing guide
16c Aperture
16d Connecting portion
16e Extension
17a Upper wall portion
17b Lower wall portion
17c Vertical wall portion
17d Guide roller
17e Pivot pin
18 Control unit
19 Memory
20 Sensor
21 Range sensor

The invention claimed is:

1. A sheet feeder feeding sheets one by one to a book binding machine from a sheet stack formed of a plurality of individual sheet bundles each of which corresponds to a book block composed of collated sheets, and stopping the sheet feed temporarily whenever the sheet feed of one sheet bundle is completed, the sheet feeder comprising:
   a frame;
   a shelf attached to the frame so as to move in a vertical direction with the sheet stack placed thereon;
   a vertical alignment plate attached to the frame, arranged adjacent to the front end of the shelf and opposite to the front face of the sheet stack on the shelf;
   a first conveyance unit attached to the frame and arranged above and opposite to the uppermost sheet of the sheet stack on the shelf and configured to convey uppermost sheet forward beyond the alignment plate by engaging with or sucking the uppermost sheet;
   a second conveyance unit attached to the frame, arranged at the downstream of the first conveyance unit and configured to receive the sheet from the first conveyance unit and discharge the sheet to the book binding apparatus;
   a control unit comprising a controller configured to control the movement of the shelf and the operation of the first and second conveyance units, wherein the first conveyance unit starts conveying the next sheet whenever the previous sheet is discharged from the second conveyance unit;
   a memory in which images of predetermined printed areas of the first or last sheets of the sheet bundles are preliminarily stored as reference data; and
   a camera supported by the frame and arranged above the sheet stack on the shelf so as to take an image of the uppermost sheet of the sheet stack within a range of the sheet corresponding to the predetermined printed area,
   wherein the image of the sheet obtained by the camera is compared with the reference data, and when the obtained image of the sheet agrees with the reference data which is the image of the predetermined printed area of the first sheet, operation of the first conveyance unit is stopped temporarily, and when the obtained image of the sheet agrees with the reference data which is the image of the predetermined printed area of the last sheet of the first conveyance unit is stopped temporarily after the such sheet is discharged from the second conveyance unit.

2. The sheet feeder according to claim 1, wherein the alignment plate is provided with an air blower, the air blower constantly blowing air toward upper sheets of the sheet stack in such a manner that the upper sheets are spaced from the sheet stack and separated from one another, wherein the first conveyance unit comprises:
   horizontal drive and idle rollers supported by the frame and arranged above the shelf and parallel to each other at a distance from each other in the sheet feed direction;
   a suction belt extending between the drive and idle rollers to circulate;

a suction box supported by the frame and arranged between upper and lower linear portions of the suction belt, the suction box having a plurality of intake ports at the under surface thereof; and a suction unit connected to the suction box and configured to create negative pressure in the suction box, the uppermost sheet being conveyed to the second conveyance unit by the suction box sucking the sheet through the circulating suction belt, and wherein the camera is supported by a supporting mechanism attached to the frame and the supporting mechanism is provided with a camera holder, the camera holder comprising:

a holding portion holding the camera in such a manner that the camera is directed to downward;

an image capturing guide arranged below and opposite to a lens of the camera, the image capturing guide having an aperture at the center thereof and the horizontal flat under surface; and a connecting portion extending between the image capturing guide and the holding portion, and wherein the camera holder is set in such a manner that the aperture of the image capturing guide aligns with the predetermined printed areas of the first or last sheets of the sheet bundles, the uppermost sheet floating above the sheet stack contacts with the under surface of the image capturing guide, and the control unit compares between the image obtained by the camera through the aperture during the contact of the uppermost sheet with the image capturing guide and the reference data.

3. The sheet feeder according to claim 2, wherein a sensor is arranged at the exit of the second conveyance unit to detect the passage of the leading end of the sheet, and the sheet following the detected sheet contact with the image capturing guide whenever the sensor outputs a detection signal, and wherein the control unit compares the image obtained by the camera through the aperture with the reference data.

4. The sheet feeder according to claim 3, wherein the supporting mechanism comprises:

a first guide rail fixed to the frame and arranged above the sheet stack on the shelf in such a way that the first guide rail horizontally extends in a width direction of the sheet stack; a first slider slidably attached to the first guide rail;

a second guide rail fixed to the first slider and extending from the first slider perpendicularly to the first guide rail and in a length direction of the sheet stack;

a second slider slidably attached to the second guide rail; and a camera holder attached to the second slider.

* * * * *